US012284982B2

(12) United States Patent
Vogels

(10) Patent No.: US 12,284,982 B2
(45) Date of Patent: Apr. 29, 2025

(54) SYSTEM AND APPARATUS FOR THE MONITORING OF LIVESTOCK AND THE LIKE

(71) Applicant: mOOvement Holding B.V., Utrecht (NL)

(72) Inventor: Pieter Vogels, Utrecht (NL)

(73) Assignee: mOOverment Holding B.V., Utrecht (NL)

( * ) Notice: Subject to any disclaimer, the term of this patent is extended or adjusted under 35 U.S.C. 154(b) by 218 days.

(21) Appl. No.: 17/755,407

(22) PCT Filed: Nov. 3, 2020

(86) PCT No.: PCT/EP2020/080811
§ 371 (c)(1),
(2) Date: Apr. 28, 2022

(87) PCT Pub. No.: WO2021/089541
PCT Pub. Date: May 14, 2021

(65) Prior Publication Data
US 2022/0369593 A1 Nov. 24, 2022

(30) Foreign Application Priority Data
Nov. 4, 2019 (AU) .................................. 2019904156

(51) Int. Cl.
*A01K 11/00* (2006.01)
(52) U.S. Cl.
CPC .................................. *A01K 11/004* (2013.01)
(58) Field of Classification Search
None
See application file for complete search history.

(56) References Cited

U.S. PATENT DOCUMENTS 6,271,753 B1 * 8/2001 Shukla ................. B65D 55/028
340/571
10,299,018 B1 * 5/2019 King ........................ H04B 5/77
(Continued)

FOREIGN PATENT DOCUMENTS

AU 2014270036 A1 * 1/2016 ............. A01K 11/00
CA 2796518 A1 * 10/2011 ............. F21K 9/232
(Continued)

OTHER PUBLICATIONS

ISR-WO dated Jan. 25, 2021 for parent application PCT/EP2020/080811.
(Continued)

*Primary Examiner* — Fekadeselassie Girma
(74) *Attorney, Agent, or Firm* — Vorys, Sater, Seymour and Pease LLP

(57) ABSTRACT

An electronic ear tag [1] for use in the monitoring or management of livestock has a mass of 32 grams or less. The tag has a polycarbonate housing [3] made with front and rear portions [9] and [11] which are ultrasonically welded together, and has a short neck [7] and a prong [15] for attachment to the ear of an animal. A PCB [40] in the housing includes a microprocessor, a GNSS module and a LoRa transceiver and antenna. A gateway [103] for communication with the ear tag {1] and with the telephone network is also disclosed, as is an animal monitoring and/or management system which uses the ear tag [1] and the gateway [103].

20 Claims, 17 Drawing Sheets

(56) References Cited

U.S. PATENT DOCUMENTS

| | | | |
|---|---|---|---|
| 2012/0032805 A1* | 2/2012 | Brodzik | E05B 73/0064 340/572.8 |
| 2013/0340305 A1* | 12/2013 | Mobley | A01K 11/004 40/300 |
| 2016/0140458 A1* | 5/2016 | Gilbert | G06Q 10/02 705/5 |
| 2017/0061525 A1* | 3/2017 | McCoy | G06Q 30/0639 |
| 2017/0202179 A1* | 7/2017 | Goldberg | A01K 11/001 |
| 2017/0224456 A1* | 8/2017 | Hilpert | A61D 13/00 |
| 2018/0067200 A1* | 3/2018 | Cook | G08B 25/08 |
| 2018/0206455 A1* | 7/2018 | Thiex | A01K 11/008 |
| 2019/0325777 A1* | 10/2019 | Heuvelink-Marck | G09B 5/00 |
| 2020/0037837 A1* | 2/2020 | Hsieh | A47L 7/0047 |
| 2020/0178800 A1* | 6/2020 | Geissler | H04W 4/029 |
| 2021/0104335 A1* | 4/2021 | Han | G16Y 10/05 |
| 2022/0200519 A1* | 6/2022 | Biffert | G06K 19/07762 |
| 2022/0369593 A1* | 11/2022 | Vogels | A01K 11/004 |
| 2023/0211269 A1* | 7/2023 | Hsieh | B01D 46/0005 96/226 |
| 2023/0413782 A1* | 12/2023 | Trimble | A01K 7/005 |

FOREIGN PATENT DOCUMENTS

| | | | | | |
|---|---|---|---|---|---|
| CA | 2519808 | C | * | 6/2012 | G01S 19/07 |
| CA | 3107637 | A1 | * | 2/2019 | G01J 1/0219 |
| CA | 2978714 | C | * | 4/2019 | G01S 19/05 |
| CA | 2973006 | C | * | 8/2019 | G01S 5/0027 |
| CA | 2997440 | A1 | * | 9/2019 | |
| KR | 101204277 | B1 | * | 11/2012 | G01S 19/14 |
| RU | 181524 | U1 | * | 7/2018 | |
| WO | WO-2011008170 | A1 | * | 1/2011 | A01K 11/004 |
| WO | 2019089456 | A1 | | 5/2019 | |
| WO | 2019209712 | A1 | | 10/2019 | |
| WO | 2021089541 | A1 | | 5/2021 | |

OTHER PUBLICATIONS

Jimilot, "Everything You Want to Know about GSM / NB-IoT / LoRa Ear Tag GPS Tracker", Sep. 19, 2019 (Sep. 19, 2019), p. 1-3.

\* cited by examiner

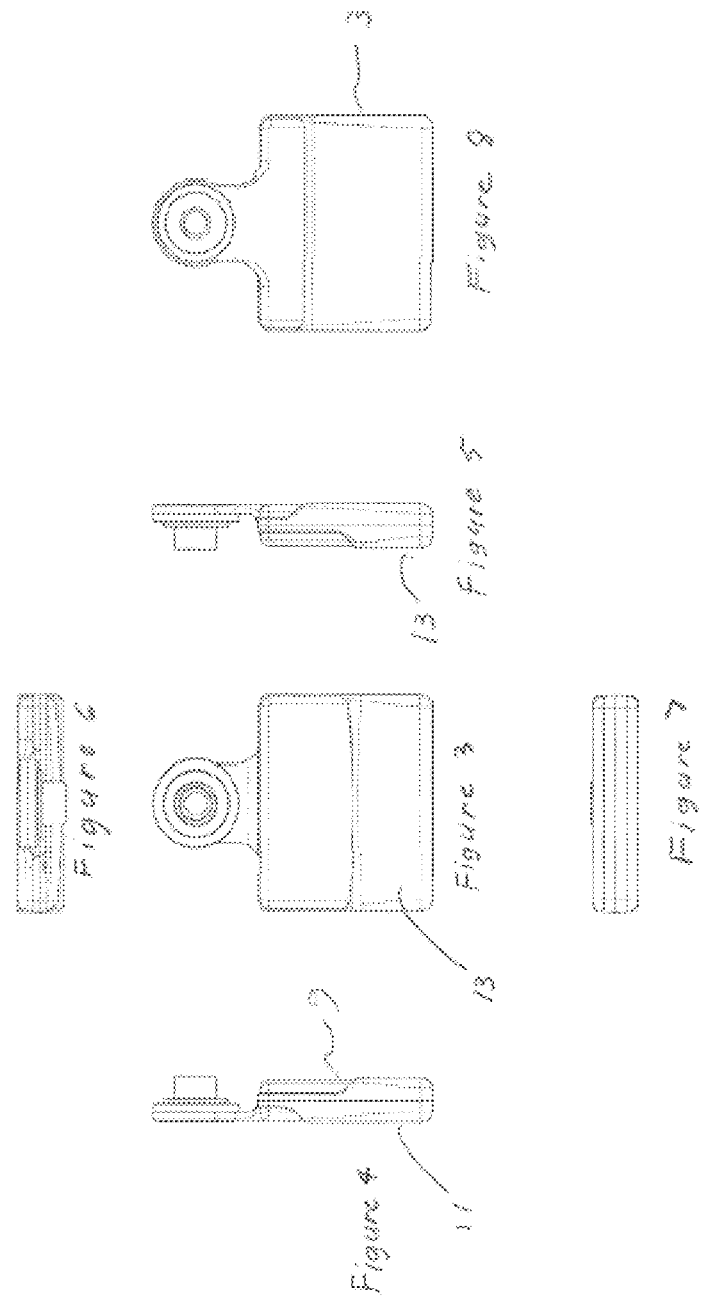

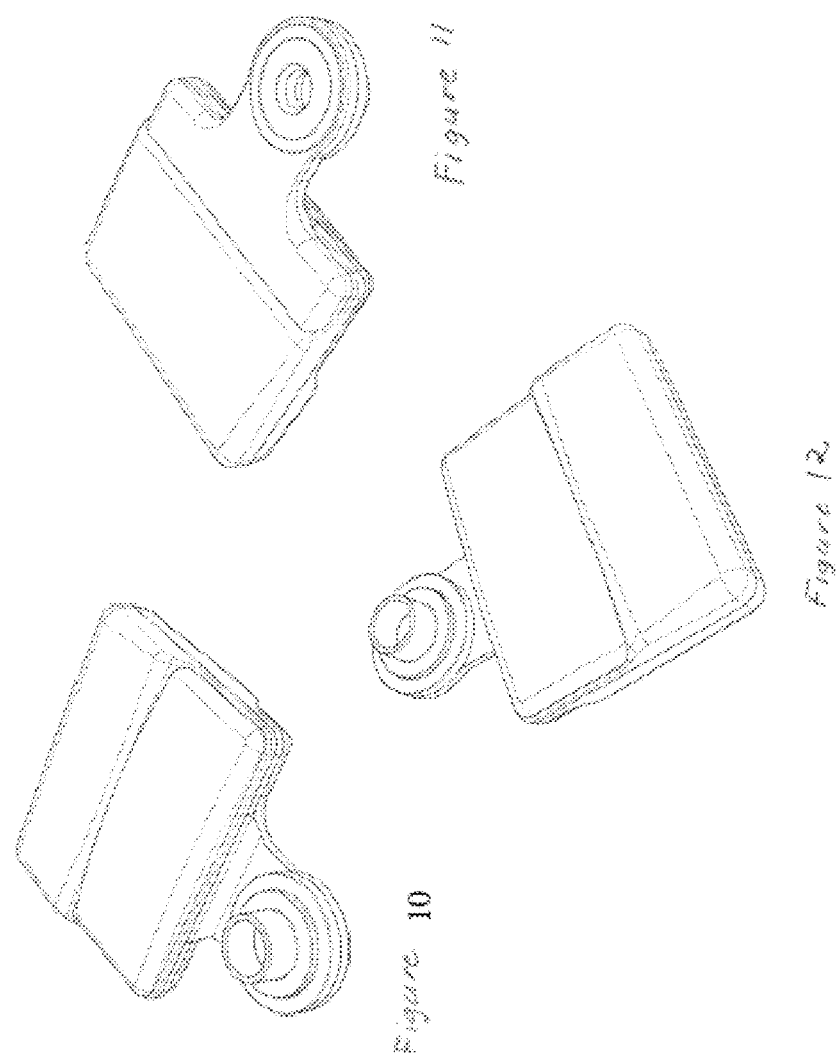

SYSTEM AND APPARATUS FOR THE MONITORING OF LIVESTOCK AND THE LIKE

FIELD OF INVENTION

The present invention relates to the monitoring of animals and is particularly suitable for the monitoring of livestock.

In one aspect, the invention relates to an ear tag or the like which is used for the monitoring of animals.

In another aspect, the invention relates to a network of devices for the monitoring and/or management of livestock or the like.

In yet another aspect, the invention relates to a system for the monitoring and/or management of livestock.

It will be convenient to hereinafter describe the invention in relation to ear tags for beef cattle, and the use of such ear tags within a system and system for monitoring and/or managing cattle, however it should be appreciated that the present invention is not limited to that use only.

BACKGROUND ART

Any discussion of documents, devices, acts or knowledge in this specification is included to explain the context of the present invention. Such discussion should not be taken as an admission that any of the material forms part of the prior art base or the common general knowledge in the relevant art in Australia, or elsewhere, on or before the priority date of the disclosure and claims herein.

Australia operates a National Livestock Identification System (NLIS) which tracks livestock from their property of birth to slaughter. The NLIS uses ear tags which carry visible data which uniquely identifies a property where the livestock is kept and data which uniquely identifies an animal. Although the visible data on NLIS ear tags may also be readable by Radio Frequency Identity (RFID) technology, that data is used only for tracking movement of animals between properties or to saleyards or the like.

It is desirable that additional functionality be added to cattle ear tags, but it will be appreciated that there are limitations as to the weight that an animal can carry in an ear tag. The addition of electronics-based functionality to an ear tag will necessarily result in an increase in the weight of the ear tag.

In general, the greater the weight of an ear tag, the greater the risk of irritation or infection, as well as a decrease in the tag's retention rate. Investigations have established that it is desirable to maintain the weight of ear tags at a weight of below about 32 grams.

There is also a need for a system to provide data driven efficiency and decision making when it comes to cattle farming. That data needs to include, or relate to:
  Real knowledge on where animals are, preferably by an indicator on a map;
  Mustering without first knowing where all the animals are;
  Not knowing if an animal has escaped;
  Not knowing if an animal has stopped moving;
  No insights on bull performance and servicing record;
  A lack of insights on animal movement patterns and grazing behaviours;
  No data link between available water, animal behaviour, and weather patterns;
  Water level insights;
  On the spot alerts for predators/theft;
  Pattern between animal behaviour and their value at sale (i.e.: how can a grazier replicate the behaviour of high performing animals).

In contrast with the ear tags of the NLIS system, embodiments of the present invention provide electronics-based ear tags that allow monitoring, and/or active management, of animals on-farm and are of a sufficiently low weight to be carried by an animal.

SUMMARY OF INVENTION

Accordingly, in one aspect, various embodiments of the present invention provide an electronic ear tag for use in the monitoring or management of livestock or the like, the ear tag having a mass of 32 grams or less, and comprising:
  a housing;
  an electronic circuit contained within the housing, the electronic circuit being adapted to:
    gather positioning data;
    gather environmental data; and
    transmit the positioning data and the environmental data to a remote location.

It is preferred that the electronic circuit comprises:
  a photovoltaic power source;
  a battery;
  a microprocessor
  a radionavigation positioning system module;
  and a wireless transceiver module and antenna.

It is preferred that the radionavigation positioning system module is a global navigation satellite system (GNSS) module. Global Navigation Satellite System (GNSS) refers to a constellation of satellites providing signals from space that transmit positioning and timing data to GNSS receivers. The receivers then use this data to determine location.

By definition, GNSS provides global coverage. Examples of GNSS include Europe's Galileo, the USA's NAVSTAR Global Positioning System (GPS), Russia's Global'naya Navigatsionnaya Sputnikovaya Sistema (GLONASS) and China's BeiDou Navigation Satellite System.

The performance of GNSS is assessed using four criteria:
  Accuracy: the difference between a receiver's measured and real position, speed or time;
  Integrity: a system's capacity to provide a threshold of confidence and, in the event of an anomaly in the positioning data, an alarm;
  Continuity: a system's ability to function without interruption;
  Availability: the percentage of time a signal fulfils the above accuracy, integrity and continuity criteria.

This performance can be improved by regional satellite-based augmentation systems (SBAS), such as the European Geostationary Navigation Overlay Service (EGNOS). EGNOS improves the accuracy and reliability of GPS information by correcting signal measurement errors and by providing information about the integrity of its signals.

It is preferred that the environmental data comprises acceleration data. Said acceleration data is preferably obtained by means of an accelerometer present on said tag. In another or further embodiment, said environmental data includes the temperature of the environment, or the temperature of the animal. To that purpose, one or more temperature sensors may be present.

It is preferred that the housing comprises plastics material. Plastics are a wide range of synthetic or semi-synthetic organic compounds that are malleable and so can be molded into solid objects. Suitable plastics include polycarbonate, polyethylene, polystyrene, polypropylene, polyvinylchloride, polyamide, acrylonitrile butadiene styrene, or mixtures thereof. In a preferred embodiment, said housing is at least partially or completely manufactured of polycarbonate, which is break resistant.

When the housing comprises plastics material, it is preferred the plastics material comprises polycarbonate material. In which case, it is preferred that at least a portion of the polycarbonate material:
- is substantially transparent to light; and
- is positioned to allow transmission of light from the exterior of the housing to
- the photovoltaic power source.

It is preferred that the housing further comprises a front portion and a back portion which have been joined together, preferably by ultrasonic welding. In a further embodiment, a flexible joint or gasket may be present between the front and back portion to ensure that the tag is water- and/or airtight. In a preferred embodiment, said flexible joint is an O-ring.

It is further preferred that the ear tag comprises means for attaching the tag to the ear of an animal, that means for attaching being integrally moulded with at least a portion of the housing.

It is preferred that a rear surface of the ear tag is substantially flat.

In a further aspect of the current invention, the ear tag of the current invention has a weight of more than 14 grams, more preferably more than 16 grams and less than 32 grams. As the tag will be attached for longer periods to the ear of the animal, it may not be too heavy such that the animal is able to sustain the tag for these long periods. Ear tags that are too heavy were shown to cause irritations to the animal, which may eventually have a severe impact on the overall wellbeing of said animal and/or lead to the loss of the ear tag.

According to an embodiment of the current invention, the back portion of the housing of the ear tag comprises ventilation perforations which allow evacuation of moisture present inside the casing of the tag. The amount of the perforations can be variable. In an embodiment, said housing comprises at least one, at least two, at least three, at least four at least five, up until ten perforations. In a preferred embodiment, five perforations are present, for instance in a configuration wherein four perforations line the corners of a square with a fifth perforation in the middle.

In a further embodiment said ventilation perforations are present in a recess of the inner side of the back portion. The recess may take any form known in the prior art, such as rectangular, square, circular, etc. This recess may accommodates the presence of an adhesive vent membrane, also known in the market as a Gore® vent. In a further preferred embodiment, said vent membrane is adhered to the recess, preferably due to the self-adhesive nature of said vent membrane. This venting solution prevents water ingress problems inside the tag and effectively equalizes pressures, thereby reducing the strain of housing seals. Because of the adhesive nature of the vents, these can also be easily retrofitted to existing tags without vent.

In a another or further embodiment, said current invention concerns an electronic ear tag having a weight of more than 16 grams and less than 32 grams, such as 28 grams, comprising a plastic housing comprising a front and a back portion joined together, preferably by ultra-sonic welding, the rear surface of the ear tag being substantially flat, and said ear tag further comprising means to attach said ear tag to an ear of said livestock, wherein said attachment means comprise an ear-mounting, a neck and a prong, and wherein said ear tag comprises within said housing an electronic circuit adapted to gather positioning data and environmental data; and is able to transmit said positioning data and the environmental data to a remote location, wherein said electronic circuit comprises a photovoltaic power source, a battery, a microprocessor, a radionavigation positioning system module, preferably a global navigation satellite system (GNSS) module, a wireless transceiver module and antenna.

In a further embodiment, said electronic circuit is present on a PCB, wherein the front side of the PCB comprises at least one or more long range low pass filters; one or more solar panels; a GNSS receptor; one or more ceramic antennas, a processor and optionally an accelerometer, and wherein a battery, preferably a lithium-polymer (LiPo) cell is mounted on the back of said PCB.

In a further embodiment, at least part of the front portion is substantially transparent to light, such that the photovoltaic power source is able to capture solar light.

It is further preferred that the neck, the ear-mounting and the prong are integrally-moulded, and are integrally-moulded with one of the front or back portions. Preferably the housing comprises at least a portion of polycarbonate material.

The ear tag according to the current invention is able to send the livestock location to provide the farmer with actionable insights and alerts and helps the user to run a better and more efficient enterprise. The tags are easy to apply, ergonomic, have a long battery life and are re-usable.

Said ear tag may comprise ventilation perforations and/or an adhesive vent membrane as described above.

In another aspect, various embodiments of the present invention provide an animal monitoring and/or management gateway comprising:
  communications means which is adapted to communicate with the ear tag which is described as in any of the embodiments above, so as to communicate data
  or commands to or from the ear tag; and communications means which is adapted to communicate data or commands over a communications network to or from a remote server. By preference, the data is transferred by means of LoRa networks. The gateway allows to monitor livestock such as cattle that reside in remote places. The user such as the farmer is able to monitor the animals by means of software such as an app running on a mobile device. As such, said user may be able to monitor the livestock in real time.

The current invention thus also includes a software application, preferably a mobile application for a mobile device or a web app portal, that visualizes the data coming from the gateway. Said data include the location of the animals, environmental data such as weather conditions, parameters linked to said livestock (e.g. heat stress, health, performance). Collected raw data is thus transformed into actionable insights and creating a usable platform that supports producers whether they are in the office or on the field.

The mobile device app is designed to be simple, but effectively support farmers on the move with specific information and tools. The web portal is designed to provide detailed insights, and allow producers to easily manage their property and animals.

In another aspect, various embodiments of the present invention provide a system for the monitoring and/or management of animals, the system comprising:
  at least one gateway as described above;
  at least one ear tag as described in any of the embodiments above.

Other aspects and preferred forms are disclosed in the specification and/or defined in the appended claims, forming a part of the description of the invention.

Further scope of applicability of embodiments of the present invention will become apparent from the detailed description below. That detailed description, and specific examples, while indicating preferred embodiments of the invention, are given by way of illustration only, since various changes and modifications within the spirit and scope of the disclosure herein will become apparent to those skilled in the art from this detailed description.

DESCRIPTION OF THE DRAWINGS

Further disclosure, objects, advantages and aspects of preferred and other embodiments of the present invention may be better understood by those skilled in the relevant art by reference to the following description of embodiments taken in conjunction with the accompanying drawings, which are given by way of illustration only, and thus are not limitative of the disclosure herein. In the drawings:

FIGS. 1, 2, 10, 11 and 12 are perspective views of an ear tag according to a first embodiment of the present invention;

FIG. 3 is a front elevational view of the ear tag according to the first embodiment of the invention;

FIG. 4 is an elevational view, from one side, of the ear tag according to the first embodiment of the invention;

FIG. 5 is an elevation view, from another side, of the ear tag according to the first embodiment of the invention;

FIG. 6 is a plan view of the ear tag according to the first embodiment of the invention;

FIG. 7 is a view from below of the ear tag according to the first embodiment of the invention;

FIG. 8 is elevational view, from the back, of the ear tag according to the first embodiment of the invention;

DETAILED DESCRIPTION

Figure 1:
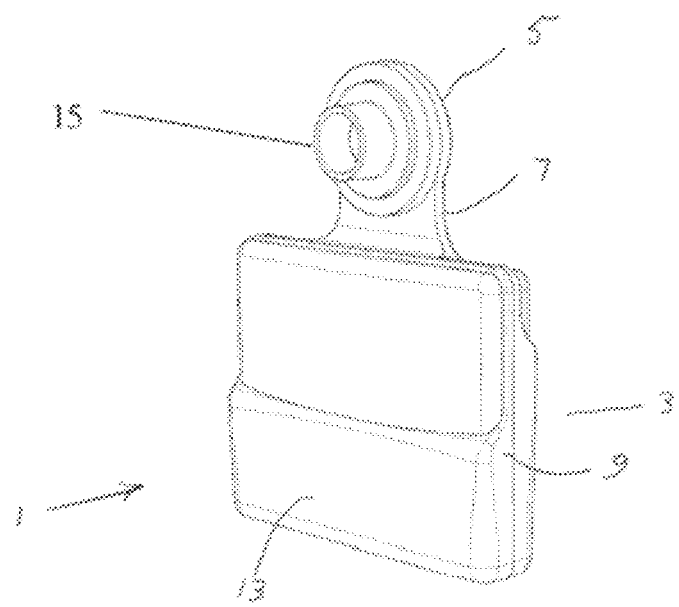
Figure 2:
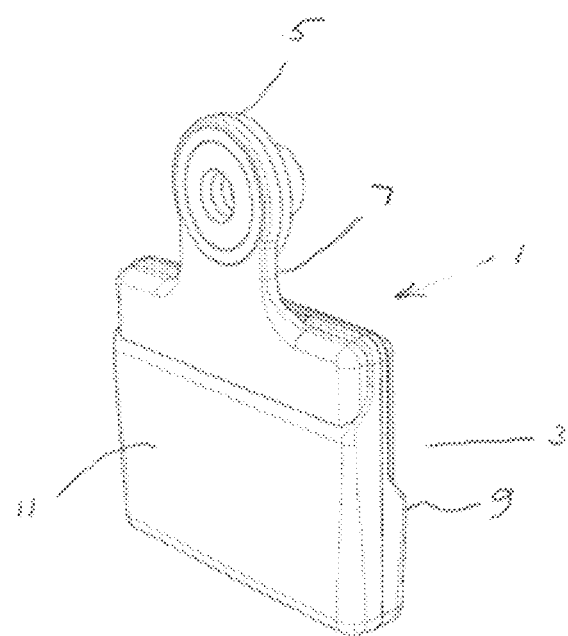

As is illustrated in FIG. 1, an ear tag 1 according a first embodiment of the present invention has a housing 3, an ear-mounting 5, a neck 7 and a prong 15. The housing 3 in turn has a front portion 9 and a back portion 11. At least a part 13 of the front portion 9 is substantially transparent to light. The neck 7 is relatively short and is preferably connected to, or is part of, the back portion 11. The neck 7 in turn carries the ear-mounting 5 remote from the housing 3. The ear-mounting 5 includes a prong 15 for fixing the ear tag 1 to the ear of an animal in the known manner. The back portion 11 is also preferably shaped to fit around a battery which is mounted on the printed circuit board (PCB) 40 (which is described below). The outer surfaces of the back portion 11 are also preferably substantially flat to reduce the risk of causing irritation to the ear of the animal. The front portion 9, the back portion 11, the neck 7, the ear-mounting 5 and the prong 15 are preferably moulded from a plastics material. It is preferred that the neck 7, the ear-mounting 5 and the prong 15 are integrally-moulded, and are integrally-moulded with one of the front or back portions 9 or 11.

The front portion 9 and the back portion 11 are joined together. A preferred method of joining is welding, such as by ultra-sonic welding.

The tag 1 needs to:
be robust;
be light;
allow infrared and visible light to pass through for the solar panels;
be of a material which is UV stable to avoid deterioration;
be flexible but very strong single prong neck;
weigh less than about 32 grams; and
be abrasion resistance.

The preferred materials for the housing 3, the neck 7 and the ear-mounting 5 are plastics materials having strength, durability, and scratch resistance. Polycarbonates with a UV stabilizer are particularly preferred.

Figure 9:
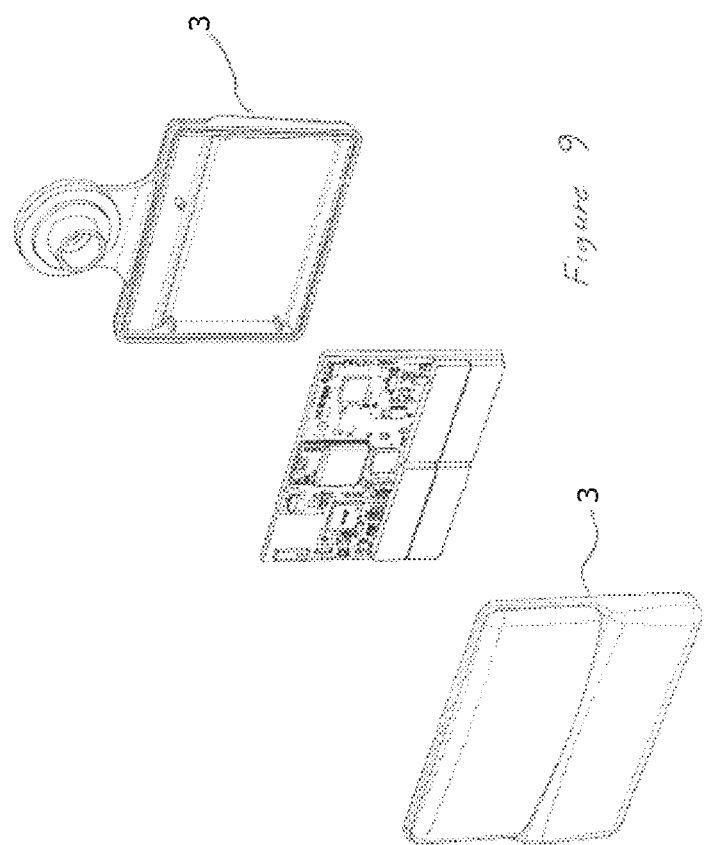
FIG. 9 is an exploded perspective view of the ear tag according to the first embodiment of the invention.

The elements of the electronic circuit are preferably present on a PCB. As is illustrated in FIG. 9, the PCB 40 is mounted within the housing 3. Preferably, the PCB 40 has a small hole to receive a knob from the housing 3 to secure it in place and reduce or avoid movement. The PCB 40 is dimensioned, and mounted within the housing 3, in a way to reduce, or to minimize, gaps between them. Batteries and antennas (which are not indicated in FIG. 9) are mounted on the PCB 40 with small air gaps around them to improve their performance (in the case of the antennas) or to allow for expansion (in the case of the batteries).

The components which are mounted on the front side of the PCB 40 include the following:
long range (LoRa) low pass filter(s);
solar panel(s);
ceramic antenna(s);
a clock and timing crystal;
an ambient energy manager for power management;
an energy efficient ARM (Advanced RISC Machine) processor;
a ferrite bead to protect components from high frequencies;
a GNSS (Global Navigation Satellite System) receptor:
wireless long-range low power transceiver;
a step-down DC-DC converter; and
preferably, a tri-axis accelerometer.

A lithium-polymer (LiPo) cell is mounted on the back of the PCB 40.

The components of the ear tag were chosen based on functionality, compatibility, size, weight and cost to keep the total weight of the ear tag below approximately 32 grams. They are placed on the PCB 40 to avoid interference or performance reduction.

Figure 21:
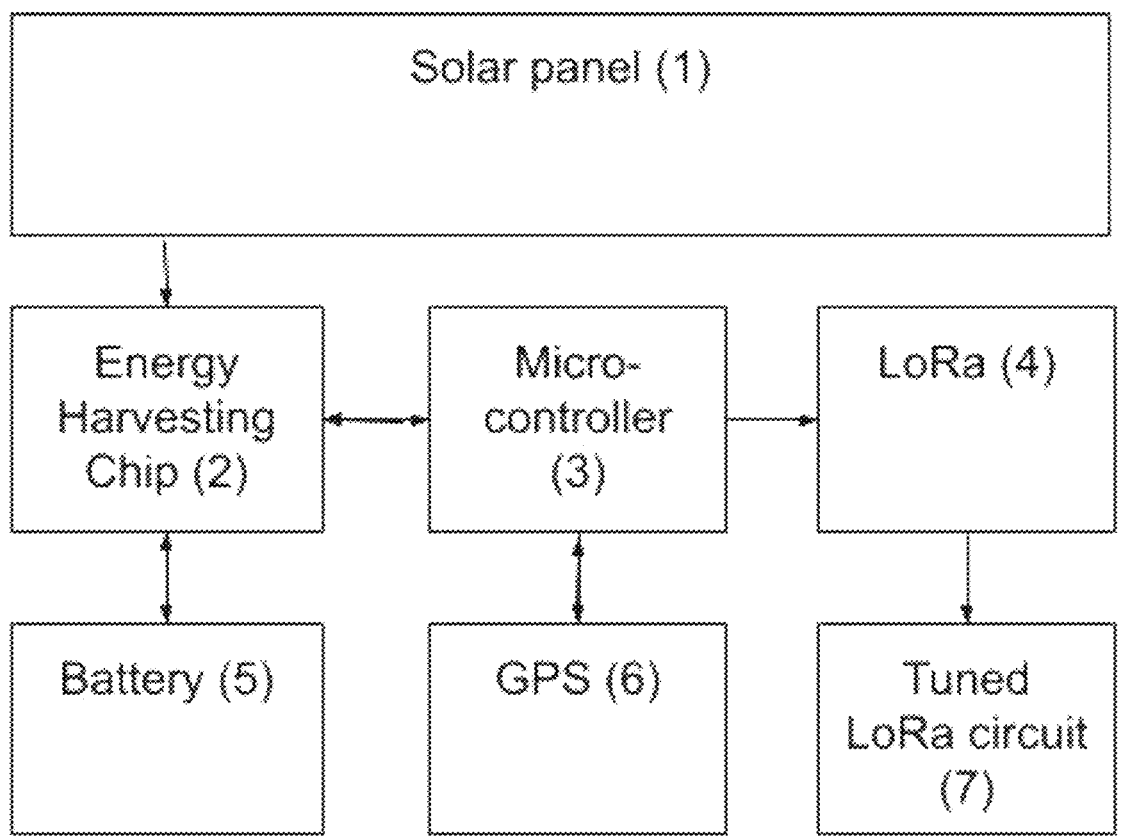
FIG. 21 is a high-level block diagram of the electronic circuitry of the ear tag of FIGS. 1 to 9.
Figure 22:
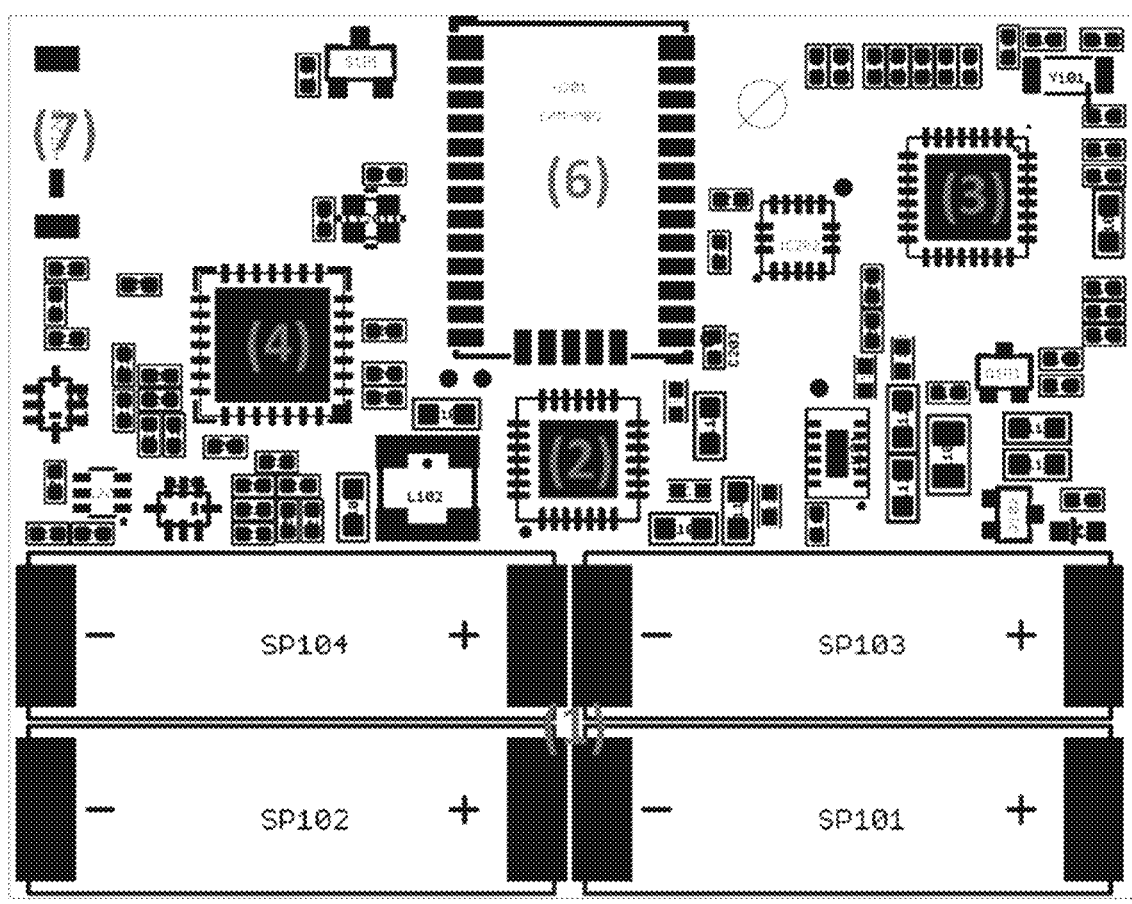
FIG. 22 illustrates the layout of components on one side of a circuit board of the ear tag of FIGS. 1 to 9.
Figure 23:
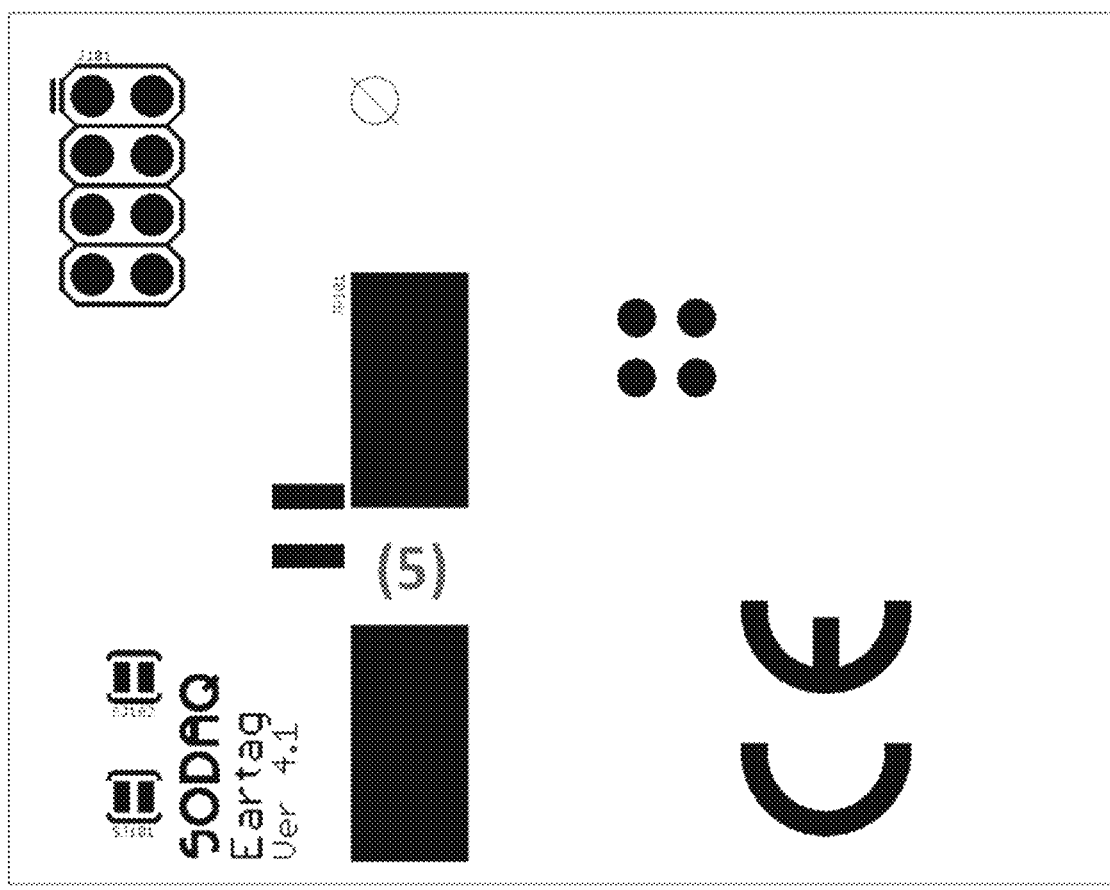
FIG. 23 illustrates the layout of components on the other side of a circuit board of the ear tag of FIGS. 1 to 9.

FIG. 21 is a high-level block diagram of the electronic circuitry on the PCB 40. FIGS. 22 and 23 illustrates the layout of components on the front and back sides of respectively of the PCB 40. In FIGS. 21 to 23, the components are identified as follows:
(1) solar panel;
(2) energy harvesting chip;

(3) micro-controller;
(4) LoRa transceiver;
(5) battery;
(6) GPS module
(7) LoRa tuned circuit.

The clearance of the LoRa antenna is chosen in such a way that the performance of the total LoRa transmission is optimized.

Weight is one of the most important requirements for the ear tag. Regarding the PCB weight of 14 grams, the weight of the casing could only be 16 grams. The casing of 16 grams should be strong enough to withstand the severe cattle forces and weather circumstances. Moreover, the antenna is completely retuned for optimal transmission through the casing.

Currently there is a specific GPS algorithm to improve the GPS performance. The previous satellites are saved in such a way in the internal memory that in case of a next GPS fix, the fix time and accuracy are improved.

With reference to FIGS. 21 to 23, the functions and requirements for the circuit components are as follows.

The solar panel has a high efficiency and is placed to minimize the distance to the energy harvesting chip, reducing losses in the line.

The ambient energy manager is a high-quality energy harvesting chip, designed to efficiently exploit solar panels in combination with a battery.

The low power microcontroller combines all sensor values and determines, based on the battery voltage, which functions are enabled. A timing schedule saves battery power when the sun is low.

The Lora Chip and circuit are optimized to transmit with a low transmission power.

The battery is dimensioned specially based on weight and needed energy.

The GPS module is only on when the microcontroller decides that there is enough battery power.

The LoRa circuit and antenna are specially tuned for the casing. The detuning of cattle ears is compensated by a tuning network.

With the one ear tag, the 868 MHz band can also be served from a LoRa perspective. GPS functionality can be extended and improved by using a multi constellation module to exploit GLONASS, Galileo and Beidou.

Figure 13:
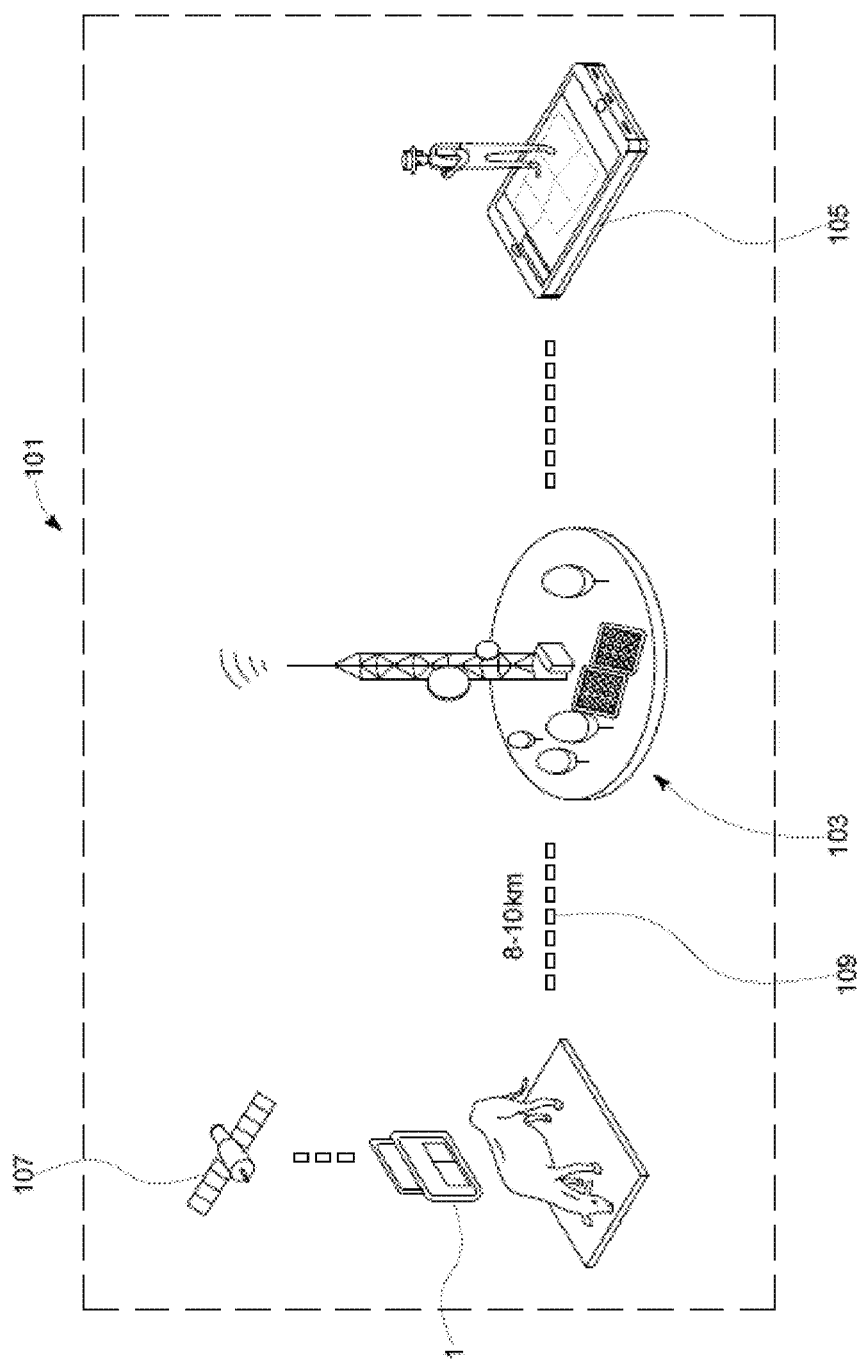
FIG. 13 illustrates a system of devices according to one embodiment of the present invention.

As is illustrated in FIG. 13, an animal monitoring and management network 101 according to the second aspect of the present invention includes at least one gateway 103, and is connectible to ear tags 1, to mobile or desktop computing devices 105, and to GNSS satellites 107. Each gateway 103 is wirelessly connectable to the ear tags 1, preferably by a low-power wide-area network (LPWAN), such as a network using LoRa technology), preferably having a range of about 8 km. Each gateway 103 is also connectable, via the mobile telephony network (or other communications network) to a back-office processor (preferably including a Web server) which is not illustrated in the drawings. The computing devices 105 are connectible with the Web server through, preferably through the mobile or fixed telephone networks. Preferred forms of the computing devices 105 include tablet devices and smartphones.

When the system in use, each tag 1 transmits encrypted data packages to a gateway at least every 3 hours, more preferably at least every 2 hours, or at least hourly. Each gateway 103 forwards this data to a router which sends it via the internet (or other network) to the back-office processor on TTI. TTI matches the encrypted data to a system device list to ensure it belongs to the system. Once confirmed, TTI decrypts the data and forwards it to the back-office server, the back-office processor stores the raw data, and processes it into known fields:
battery level;
time;
gateway received;
tag ID;
coordinates;
air time;
received signal strength indicator (RSSI); and
signal-to-noise ratio (SNR).

The gateway 103 is provided in two versions, an off-grid version for use where there is no connection available to the mains power grid or other reliable power supply, and an on-grid version. Each gateway 103 includes at least one wireless communications transceiver for communicating with ear tags 1. Each gateway 103 also includes, or is connectable to, the antennas which are necessary for communicating with ear tags 1. Each gateway 103 includes a router which takes a Subscriber Identity Module (SIM) card, and/or connectivity to the fixed-wire telephone network. In the case of the off-grid version of the gateway 103, the gateway includes a re-chargeable battery or batteries, and is connectable to a photovoltaic power supply.

When the monitoring and management network 101 is in use, the GNSS module (which is not shown in the drawings) in the ear tags 1 receive signals for the GNSS satellites 107 to derive location information. That location information, together with data from the accelerometer (which is not shown in the drawings) are transmitted over the LoRa network 109 to the gateway 103 and from there, over the GSM or other telephone network to the back-office processor. The back-office processor is accessible from the computing devices 105 to allow the downloading of information from that processor or to allow the issuing of commands to animal monitoring or management software which is running on that processor.

Figure 14:
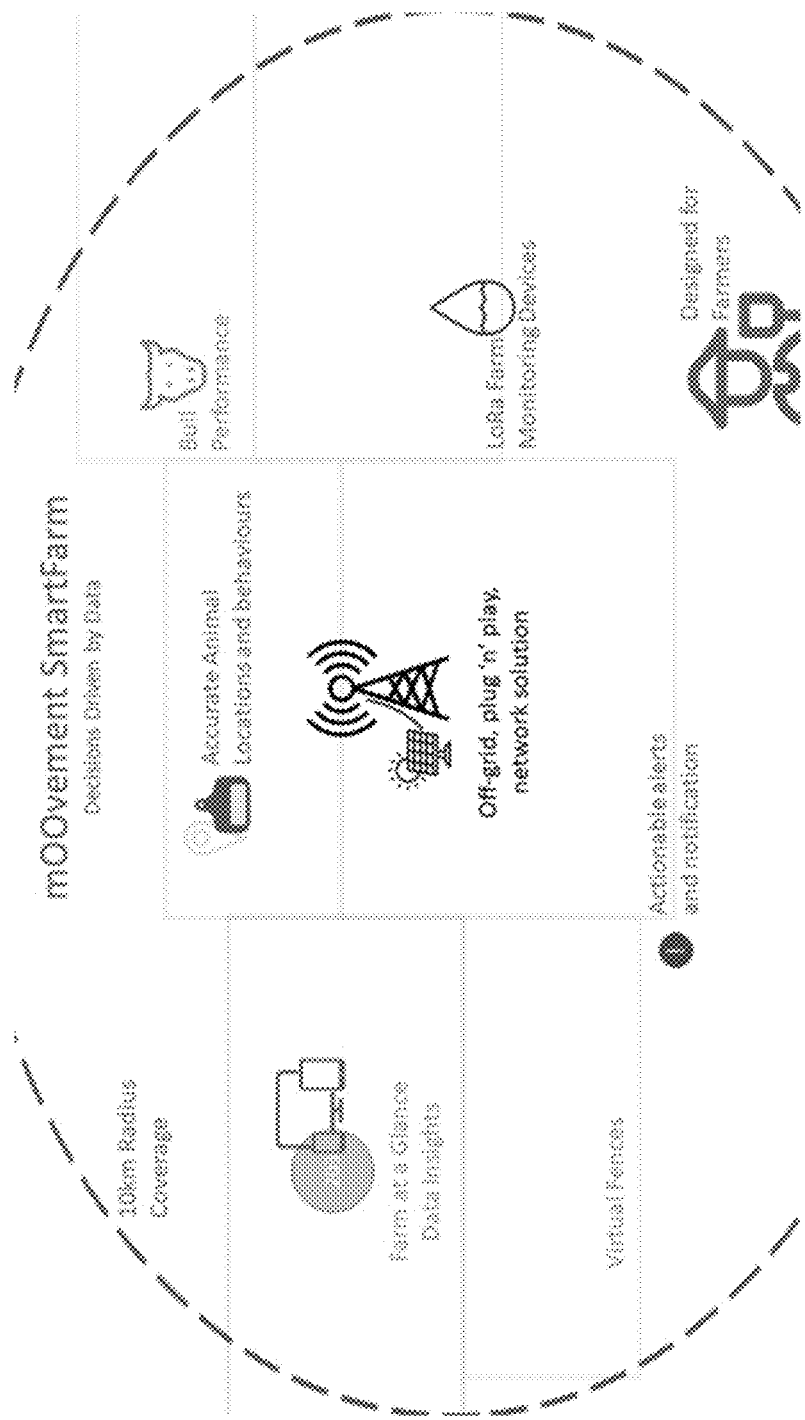
FIG. 14 illustrates a system for the monitoring and/or management of livestock according to another embodiment of the present invention.

A system 150 for the monitoring and/or management of livestock according to another embodiment of the present invention is illustrated schematically in FIG. 14. As is show in that Figure, this embodiment of the invention uses the previously-described ear tags 1, and the previously-described network 101, to perform the following functionality for monitoring, and/or managing, livestock;
muster mode to send higher accuracy location every 15 minutes for several hours;
GNSS tracking during sleep to reduce battery consumption on wake up;
remotely change tag settings (required battery level for location fix, frequency of location fix, power of transmitted signal));
QR onboarding;
processing accelerometer data to generate animal behaviour and event alerts:
theft alert;
detailed not moving alert;
predator alert;
bull servicing and cow relation;
step counter; and
tag dropped alert.

Collected raw data is thus transformed into actionable insights and creating a usable platform that supports producers whether they are in the office or on the field. The system accordingly includes mobile device apps, and Web app portal.

The mobile device app is designed to be simple, but effectively support farmers on the move with specific information and tools:
- onboarding tags to their property using the unique tag QR code;
- showing animals locations on a map and when they were seen;
- paddock lines;
- add/edit high level animal details;
- move animals between paddocks;
- alerts if there is an animal in trouble;
- water levels;
- an operator's own location relative to animals and paddocks; and
- make notes about specific animals.

The web portal is designed to provide detailed insights, and allow producers to easily manage their property and animals, features include:
- easy animal management and paddock moves;
- quickly spot out where the bulls are located;
- bull performance (outlined below);
- property status in a map overview
- detailed animal management both bulk action and individual actions;
- create and manage paddocks;
- a heat map;
- graphs and tables based on real data showing:
  - how much animals move vs temperature;
  - grazing patters;
  - movement patterns;
  - bull to herd interaction;
  - water levels over time; and
  - step counter.

Figure 15:
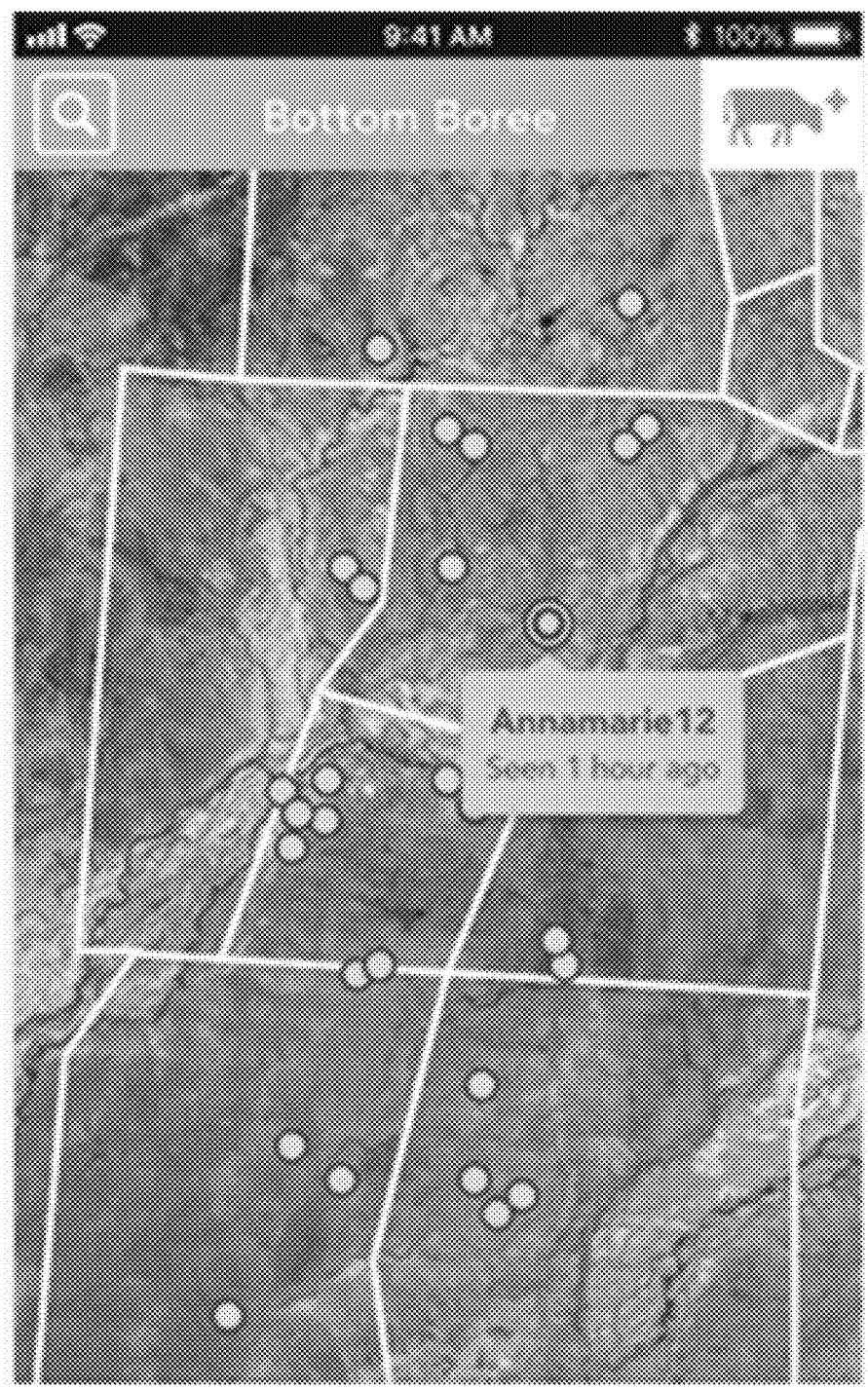
FIGS. 15 to 20 illustrate data input or output screens according to the embodiment of FIG. 14.
Figure 16:
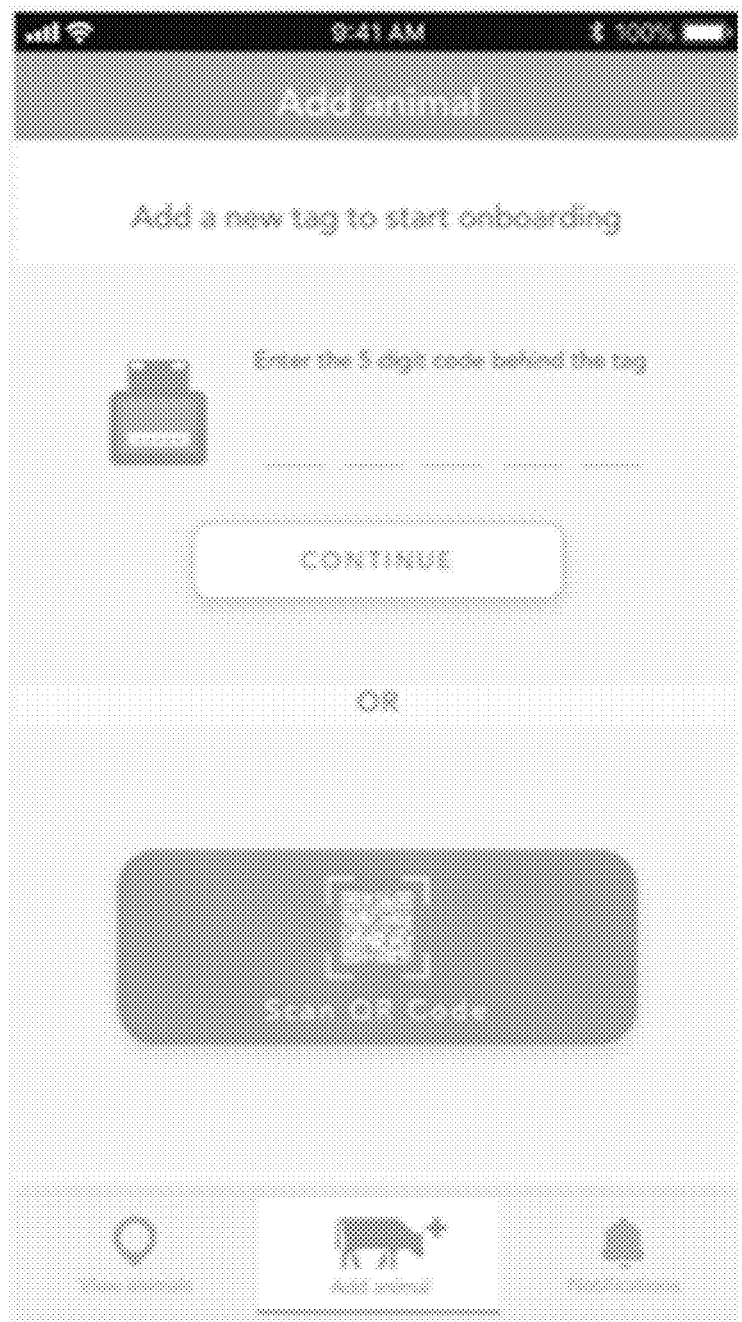
Figure 17:
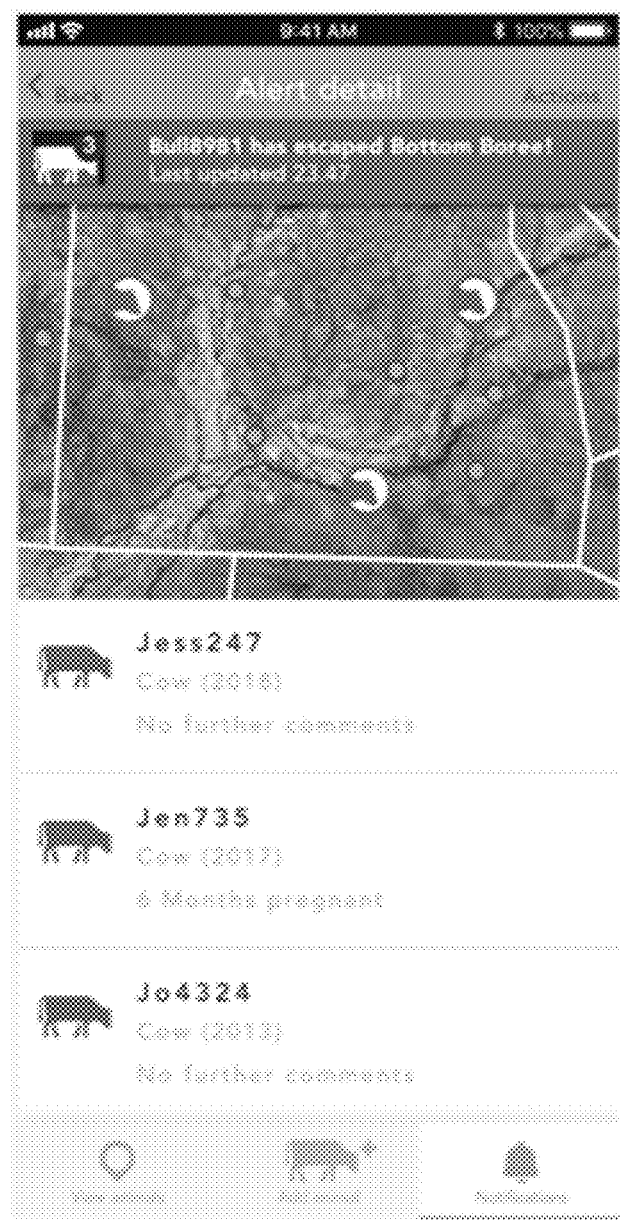
Figure 18:
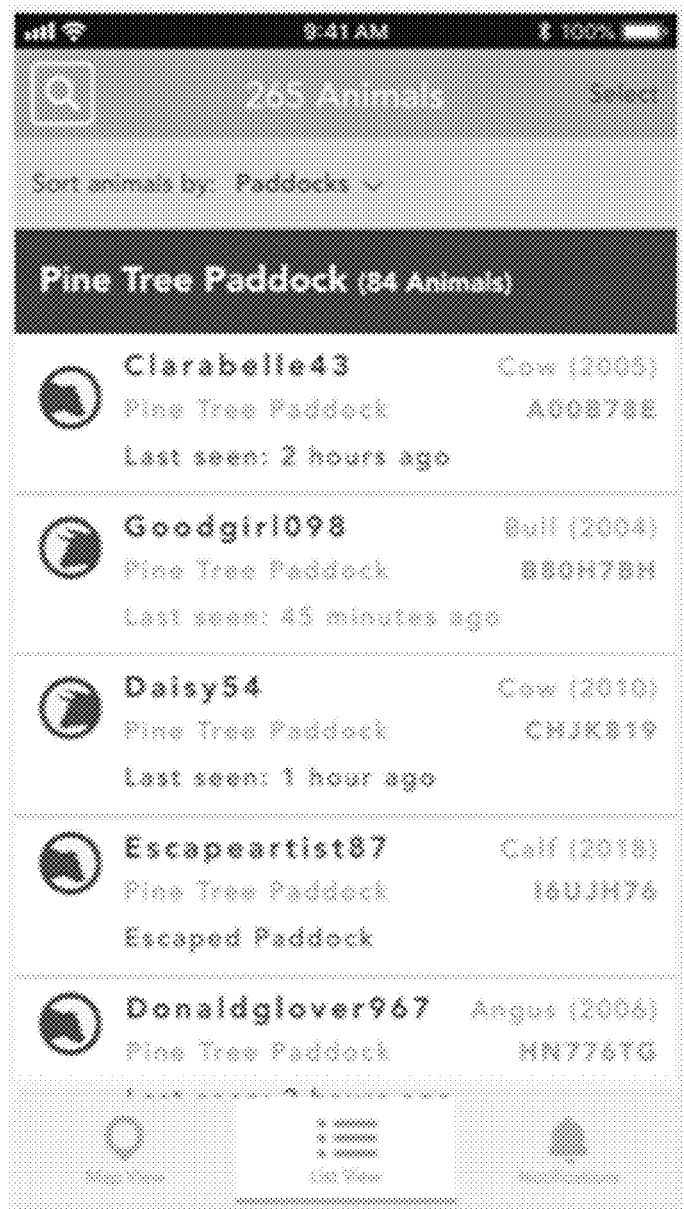
Figure 19:
Figure 20:
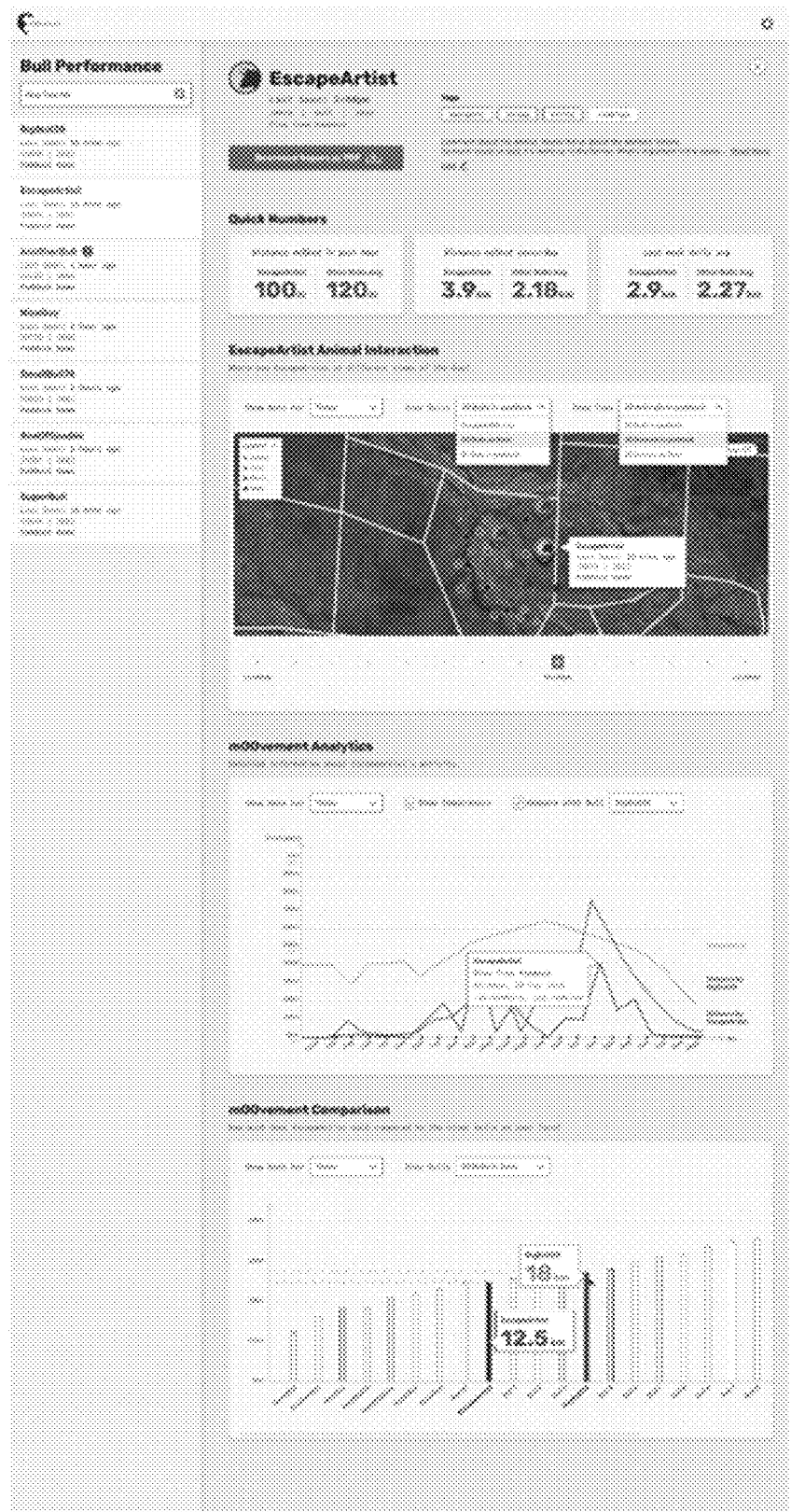

FIGS. 14 to 20 illustrate various data input and output screens which are generated in the course of operation of the system. In those Figures:
FIG. 15 is a map which shows paddocks and animals;
FIG. 16 is a tag on-boarding page showing two options, QR code or 5-digit code;
FIG. 17 shows alert details and animal overview;
FIG. 18 shows an overview of animals in a paddock;
FIG. 19 shows details relating to bull performance, with details of bulls and their location; and
FIG. 20 shows details relating to bull performance, including distance walked and overview of bulls.

Figure 24:
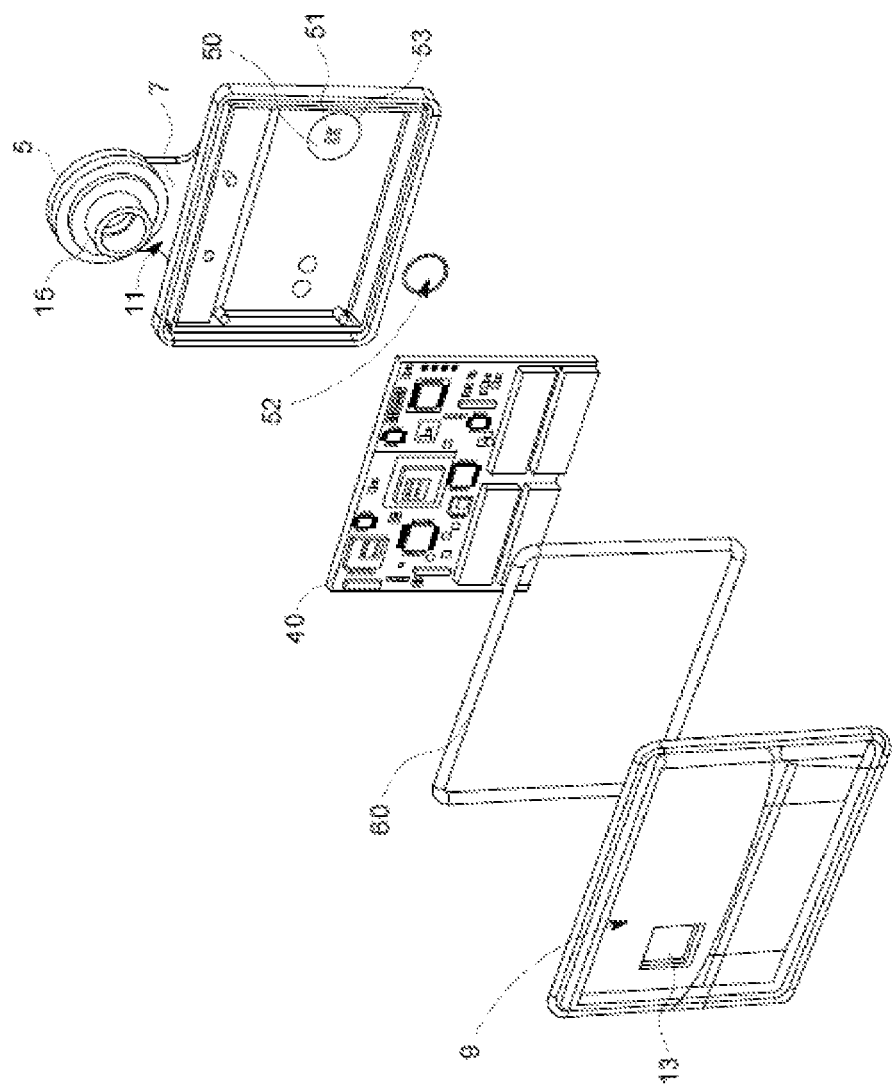
FIG. 24 is an exploded view of a tag according to an embodiment of the current invention.

FIG. 24 shows an exploded view of an ear tag according to an embodiment of the current invention. The ear tag as shown in FIG. 24 has a housing divided in front portion 9 and back portion 11. An ear-mounting 5, a neck 7 and a prong 15 is present at the back portion 11 for fixing the tag to the ear of an animal. At least a part 13 of the front portion 9 is substantially transparent to light and provides a window for QR scanning. The back portion 11 is shaped to fit a printed circuit board (PCB) 40. The PCB is provided with a variety of components as described above, including but not limiting to one or more solar panels, a battery, a microcontroller, an accelerometer, a GNSS module, a LoRa tuned circuit, an antenna, etc.

The front portion 9 and the back portion 11 are joined together. A preferred method of joining is welding, such as by ultra-sonic welding. An O-ring 60 is present between the front portion 9 and back portion 11 to seal off the joint between the front and back and to prevent the entrance of moisture. Further measures to prevent moisture damage of the interior of the tag include the presence of several ventilation perforations 51 which allow evacuation of residual moisture present inside the casing of the tag. In the example shown in FIG. 24, five ventilation perforations 51 are present in a square-like configuration of four perforations with one in the middle. Obviously, the amount of perforations can be changed, as well as their configuration. As shown in FIG. 24 and also on FIG. 25, the ventilation perforations are present in a recess 53 of the inner side of the back portion 11. This recess 53 accommodates the presence of an adhesive vent membrane, also known as Gore® vent 52 that can be adhered to said recess 53. This venting solution prevents water ingress problems inside the tag and effectively equalizes pressures, thereby reducing the strain of housing seals. Because of the adhesive nature of the vents, these can also be easily retrofitted to existing tags without vent.

Figure 25A:
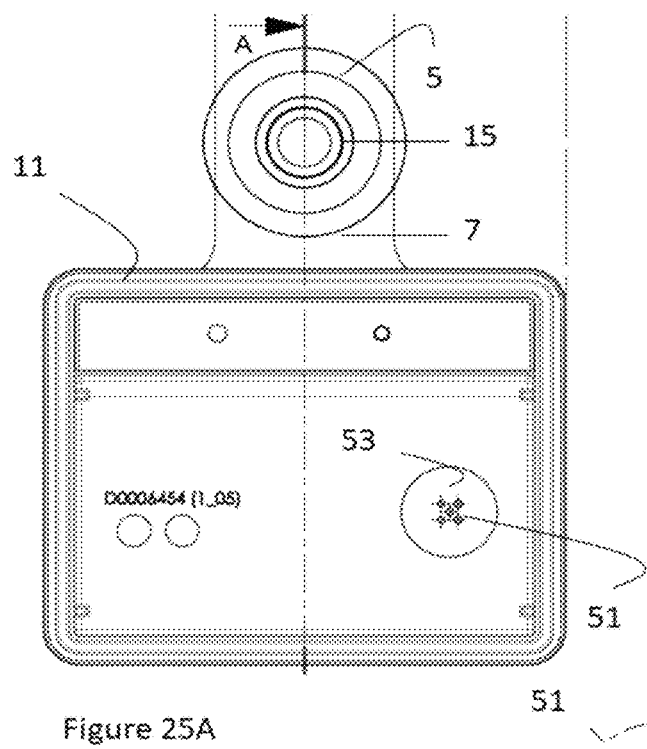
FIG. 25A, B, C illustrate an embodiment of a tag according to the current invention, provided with a water vent and ventilation perforations.
Figure 25B:
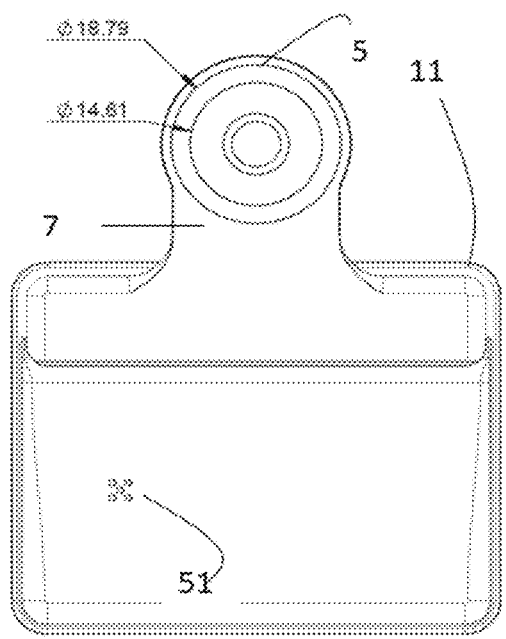
Figure 25C:
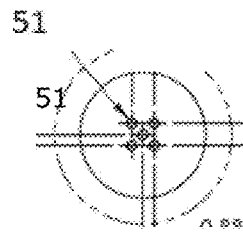

Turning to FIG. 25, a more detailed view of the recess 53 comprising ventilation perforations 51 are shown herein. FIGS. 25A and 25B show respectively the inside of the back portion 11 and outside of the back portion 11 of the tag housing. FIG. 25C is a detailed view of the ventilation perforations 51 in a square-like configuration. As in FIG. 24, the recess 53 can accommodate a vent membrane (not shown). Preferably, such vent membrane comprises an adhesive part, allowing adherence to the housing. Most preferably, said vent membrane is self-adhesive.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

The invention claimed is:

1. An electronic ear tag for use in the monitoring or management of livestock or the like and comprising:
   a housing;
   an electronic circuit contained within the housing, the electronic circuit being adapted to:
   gather positioning data via a multi-constellation global navigation satellite system (GNSS) module;
   gather environmental data, the environmental data including temperature data collected at the electronic ear tag;
   gather accelerometer data based on movement of the livestock;
   process the accelerometer data to generate one or more animal behavior alerts, the one or more animal behavior alerts comprising at least one of an animal theft alert, a not moving alert, a predator alert, and a relational alert;
   transmit the positioning data, the environmental data, and the one or more animal behavior alerts to a remote location at a low transmission power,
   wherein said ear tag has a mass of 32 grams or less.

2. The electronic ear tag as claimed in claim 1, in which the electronic circuit comprises:
   a photovoltaic power source;
   a battery;
   a microprocessor;
   the GNSS module; and
   a wireless transceiver module and antenna.

3. The electronic ear tag as claimed in claim 1, in which the GNSS module is a self-correcting GNSS module.

4. The electronic ear tag of claim 1, in which the environmental data comprises acceleration data, said acceleration data is preferably obtained by means of an accelerometer.

5. The electronic ear tag of claim 1, in which the housing comprises a polycarbonate-material.

6. The electronic ear tag of claim 5, in which at least a portion of the polycarbonate material:
is substantially transparent to light; and
is positioned to allow transmission of light from the exterior of the housing to the photovoltaic power source.

7. The electronic ear tag of claim 1 in which the housing further comprises a front portion and a back portion which have been joined together, directly or indirectly, in which the housing comprises plastics material, and in which the front portion and the back portion are ultrasonically welded together.

8. The electronic ear tag of claim 5, further comprising means for attaching the tag to the ear of an animal, that means for attaching being integrally moulded with at least a portion of the housing.

9. The electronic ear tag of claim 1, in which the back portion of the housing comprises ventilation perforations.

10. The electronic ear tag according to claim 9, wherein said ventilation perforations are located in a recess in said housing.

11. The electronic ear tag according to claim 9, further comprising a vent membrane.

12. The electronic ear tag according to claim 11, wherein said vent membrane is adhesive and attached to the recess accommodating the ventilation perforations.

13. An ear tag having a weight of more than 16 grams and less than 32 grams, comprising:
a plastic housing comprising a front and a back portion joined together,
the rear surface of the ear tag being substantially flat, and said ear tag further comprising means to attach said ear tag to an ear of said livestock,
wherein said attachment means comprise an ear-mounting, a neck and a prong, and
wherein said ear tag comprises within said housing an electronic circuit adapted to gather:
positioning data via a multi-constellation global navigation satellite system (GNSS);
environmental data, the environmental data including temperature data collected at the electronic ear tag; and
accelerometer data based on movement of the livestock; and
is able to process the accelerometer data to generate one or more animal behavior alerts and transmit said positioning data, the environmental data, and the one or more animal behavior alerts to a remote location at a low transmission power, wherein the one or more animal behavior alerts comprise at least one of an animal theft alert, a not moving alert, a predator alert, and a relational alert, and said electronic circuit comprises:
a photovoltaic power source,
a battery,
a microprocessor,
the GNSS module, and
a wireless transceiver module and antenna.

14. The ear tag according to claim 13, wherein said electronic circuit is present on a PCB, wherein the front side of the PCB comprises at least one or more long range low pass filters; one or more solar panels; a GNSS receptor; one or more ceramic antennas and a processor, and wherein a battery is mounted on the back of said PCB.

15. The ear tag according to claim 13, wherein at least part of the front portion is substantially transparent to light.

16. The ear tag according to claim 13, wherein the housing comprises at least a portion of polycarbonate material.

17. The ear tag according to claim 13, in which the back portion of the housing comprises ventilation perforations.

18. The ear tag according to claim 17, wherein said ventilation perforations are located in a recess in said housing and comprise a vent membrane.

19. The ear tag according to claim 18, wherein said vent membrane is adhesive and attached to the recess accommodating the ventilation perforations.

20. An animal monitoring and/or management gateway comprising:
communications means which is adapted to communicate with the ear tag for use in the monitoring or management of livestock or the like and comprising:
a housing;
an electronic circuit contained within the housing, the electronic circuit being adapted to:
gather positioning data via a multi-constellation global navigation satellite system (GNSS) module;
gather environmental data, the environmental data including temperature data collected at the electronic ear tag;
gather accelerometer data based on the movement of the livestock;
process the accelerometer data to generate one or more animal behavior alerts, the one or more animal behavior alerts comprising at least one of an animal theft alert, a not moving alert, a predator alert, and a relational alert;
transmit the positioning data, the environmental data, and the one or more animal behavior alerts to a remote location at a low transmission power,
wherein said ear tag has a mass of 16 grams to 32 grams;
so as to communicate data or commands to or from the ear tag; and,
communications means which is adapted to communicate data or commands over a communications network to or from a remote server.

* * * * *